United States Patent
Maeda (10) Patent No.: US 11,226,263 B2
(45) Date of Patent: Jan. 18, 2022

(54) DIAGNOSIS APPARATUS FOR INTERNAL COMBUSTION ENGINE

(71) Applicant: TOYOTA JIDOSHA KABUSHIKI KAISHA, Toyota (JP)

(72) Inventor: Toshio Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 16/813,801

(22) Filed: Mar. 10, 2020

(65) Prior Publication Data

US 2020/0300730 A1    Sep. 24, 2020

(30) Foreign Application Priority Data

Mar. 22, 2019 (JP) .............................. JP2019-055228

(51) Int. Cl.
*G01M 15/04* (2006.01)
*F02D 41/14* (2006.01)
*F02D 41/22* (2006.01)

(52) U.S. Cl.
CPC ....... *G01M 15/042* (2013.01); *F02D 41/1497* (2013.01); *F02D 41/22* (2013.01); *F02D 2200/1012* (2013.01)

(58) Field of Classification Search
CPC .. G01M 15/042; G01M 15/06; G01M 15/046; F02D 41/1497; F02D 41/22; F02D 2200/1012; F02D 2200/1015; F02D 45/00; F02B 77/083
See application file for complete search history.

(56) References Cited

U.S. PATENT DOCUMENTS

| | | | | |
|---|---|---|---|---|
| 4,179,922 A | * | 12/1979 | Bouverie | G01M 15/06 701/102 |
| 4,295,363 A | * | 10/1981 | Buck | G01M 15/046 264/551 |
| 5,915,272 A | * | 6/1999 | Foley | G01M 15/046 73/114.22 |
| 2001/0047681 A1 | * | 12/2001 | Burkardt | G01M 3/025 73/49.7 |
| 2015/0361911 A1 | | 12/2015 | Maeda et al. | |
| 2017/0101956 A1 | * | 4/2017 | Younkins | F02D 13/06 |

FOREIGN PATENT DOCUMENTS

| JP | 2015-105617 A | 6/2015 |
|---|---|---|
| JP | 2016-003564 A | 1/2016 |

* cited by examiner

*Primary Examiner* — George C Jin
(74) *Attorney, Agent, or Firm* — Oblon, McClelland, Maier & Neustadt, L.L.P.

(57) ABSTRACT

A diagnosis apparatus is applied to an in-line three-cylinder internal combustion engine, and includes a diagnosing unit and an angular acceleration derivation unit. The diagnosing unit is configured to execute a diagnosis process for diagnosing whether there is a compression leak in any one of cylinders while the internal combustion engine is in steady operation. The angular acceleration derivation unit is configured to derive an angular acceleration of a crankshaft of the internal combustion engine. The diagnosing unit is configured to, in the diagnosis process, when an amount of change in the angular acceleration per a predetermined period during an expansion stroke of any one of the cylinders is less than or equal to a threshold amount of change, diagnose that there is a compression leak in the any one of the cylinders.

6 Claims, 6 Drawing Sheets

[COMPARATIVE EXAMPLE]

FIG. 6

[COMPARATIVE EXAMPLE]

DIAGNOSIS APPARATUS FOR INTERNAL COMBUSTION ENGINE

CROSS-REFERENCE TO RELATED APPLICATIONS

This application claims priority to Japanese Patent Application No. 2019-055228 filed on Mar. 22, 2019, which is incorporated herein by reference in its entirety.

BACKGROUND

1. Technical Field

The disclosure relates to a diagnosis apparatus for an in-line three-cylinder internal combustion engine.

2. Description of Related Art

Japanese Unexamined Patent Application Publication No. 2015-105617 (JP 2015-105617 A) describes an example of a diagnosis apparatus that may be applied to an in-line four-cylinder internal combustion engine or a six-cylinder internal combustion engine. The diagnosis apparatus executes a diagnosis process for diagnosing whether there is a compression leak in any cylinder while an internal combustion engine is in steady operation. In the diagnosis process, during the expansion stroke of a certain cylinder, when an angular acceleration of a crankshaft of the internal combustion engine is negative and the angular acceleration continuously decreases until a determination period elapses from a compression top dead center, it is diagnosed that there is a compression leak in the cylinder.

SUMMARY

JP 2015-105617 A does not describe any disclosure about a technique for making it possible to diagnose whether there is a compression leak in any cylinder in an in-line three-cylinder internal combustion engine.

The disclosure provides a diagnosis apparatus for an internal combustion engine, which diagnoses whether there is a compression leak in any cylinder while the internal combustion engine is in steady operation.

An aspect of the disclosure relates to a diagnosis apparatus that is applied to an in-line three-cylinder internal combustion engine. The diagnosis apparatus includes a diagnosing unit and an angular acceleration derivation unit. The diagnosing unit is configured to execute a diagnosis process for diagnosing whether there is a compression leak in any one of cylinders while the internal combustion engine is in steady operation. The angular acceleration derivation unit is configured to derive an angular acceleration of a crankshaft of the internal combustion engine. The diagnosing unit is configured to, in the diagnosis process, when an amount of change in the angular acceleration per a predetermined period during an expansion stroke of any one of the cylinders is less than or equal to a threshold amount of change, diagnose that there is a compression leak in the any one of the cylinders. In the diagnosis apparatus according to the above aspect, the predetermined period may be a period required for a crank angle of the crankshaft to change by a predetermined crank angle.

In an in-line four-cylinder internal combustion engine or a six-cylinder internal combustion engine, when the internal combustion engine is in steady operation, during an expansion stroke of a cylinder in which there is a compression leak, the amount of reduction per unit time in the angular velocity of a crankshaft significantly changes, that is, the angular acceleration of the crankshaft significantly changes. On the other hand, in an in-line three-cylinder internal combustion engine, when the internal combustion engine is in steady operation, the angular acceleration does not significantly change during an expansion stroke of a cylinder in which there is a compression leak. In other words, when the internal combustion engine is in steady operation, the mode of change in angular acceleration during the expansion stroke of a cylinder in which there is a compression leak is different between an in-line three-cylinder internal combustion engine and each of an in-line four-cylinder internal combustion engine and a six-cylinder internal combustion engine. For this reason, when a process similar to a diagnosis process that is applied to an in-line four-cylinder internal combustion engine or a six-cylinder internal combustion engine is applied to an in-line three-cylinder internal combustion engine, it cannot be diagnosed that there is a compression leak even when there is actually a compression leak in a cylinder.

In an in-line three-cylinder internal combustion engine, when the internal combustion engine is in steady operation, and when there is no compression leak in any cylinder, the angular acceleration significantly changes during the expansion stroke, and the angular acceleration periodically varies.

In an in-line three-cylinder internal combustion engine, when the amount of change in angular acceleration per a predetermined period during an expansion stroke of any one of the cylinders is less than or equal to the threshold amount of change, it may be determined that the angular acceleration has not changed so much during the expansion stroke of the any one of the cylinders. Therefore, with the diagnosis apparatus having the above configuration, in an in-line three-cylinder internal combustion engine, whether there is a compression leak in a cylinder can be diagnosed.

In the diagnosis apparatus for an internal combustion engine according to the above aspect, the diagnosing unit may be configured to, in the diagnosis process, repeatedly perform a determination as to whether the amount of change in the angular acceleration per the predetermined period during the expansion stroke of each cylinder is less than or equal to the threshold amount of change, and, when the amount of change of any one of the cylinders is successively less than or equal to the threshold amount of change or when the number of times the amount of change of any one of the cylinders is less than or equal to the threshold amount of change is greater than or equal to a threshold value, diagnose that there is a compression leak in the any one of the cylinders.

In the expansion stroke of a cylinder in which there is no compression leak, although the amount of change in angular acceleration per a predetermined period can be less than the threshold amount of change, the fact that the amount of change is less than or equal to the threshold amount of change successively occurs or occurs multiple times or more hardly appears when the above-described determination is repeatedly performed during the expansion stroke. In this respect, with the diagnosis apparatus having the above configuration, when the determination is repeatedly performed during a single expansion stroke and it is successively determined that the amount of change of any one of the cylinders is less than or equal to the threshold amount of change or the number of times it is determined that the amount of change of any one of the cylinders is less than or equal to the threshold amount of change is greater than or equal to the threshold value, it is diagnosed that there is a compression leak in the any one of the cylinders. Therefore, the accuracy of diagnosing whether there is a compression leak can be increased.

When the internal combustion engine is in steady operation, gas in each of the cylinders is compressed as a result of movement of an associated one of pistons to a compression top dead center during a compression stroke of the cylinder in which there is no compression leak, so the amount of reduction in the moving speed of the associated piston increases as the piston approaches the compression top dead center. In other words, the angular acceleration decreases. On the other hand, during the compression stroke of a cylinder in which there is a compression leak, gas flows out of a combustion chamber of the cylinder as a result of movement of an associated piston to the compression top dead center, so the amount of reduction in the moving speed of the piston does not increase even when the piston approaches the compression top dead center. In other words, the angular acceleration is difficult to decrease. In other words, there occurs a deviation between an angular acceleration at a start of the expansion stroke of a cylinder in which there is a compression leak and an angular acceleration at a start of the expansion stroke of a cylinder in which there is no compression leak.

In the diagnosis apparatus for an internal combustion engine according to the above aspect, the diagnosing unit may be configured to, in the diagnosis process, on condition that an amount of change in the angular acceleration per the predetermined period during the expansion stroke of one of the cylinders is less than or equal to the threshold amount of change and a difference between the angular acceleration at a start of the expansion stroke of the one of the cylinders and the angular acceleration at a start of the expansion stroke of another one of the cylinders is greater than or equal to a threshold difference, diagnose that there is a compression leak in the one of the cylinders. When the difference is greater than or equal to the threshold difference, it may be determined that there is a deviation between the angular acceleration at a start of the expansion stroke of one of the cylinders and the angular acceleration at a start of the expansion stroke of another one of the cylinders. Therefore, with the diagnosis apparatus having the above configuration, by adding a determination as to whether the difference is greater than or equal to the threshold difference as information for making a determination to diagnose whether there is a compression leak in a cylinder, the accuracy of diagnosing whether there is a compression leak in the cylinder can be increased.

When the internal combustion engine is in steady operation, air-fuel mixture is not burned in a cylinder in which there is a compression leak during the expansion stroke of the cylinder. In the compression stroke that is the stroke preceding the expansion stroke, air-fuel mixture in the cylinder is almost not compressed. Therefore, during the expansion stroke, propelling force to rotate the crankshaft is not obtained, and the engine rotation speed does not change so much. In other words, the angular acceleration during the expansion stroke changes and takes values around "zero". In the diagnosis apparatus for an internal combustion engine according to the above aspect, the diagnosing unit may be configured to, in the diagnosis process, on condition that an amount of change in the angular acceleration per the predetermined period during the expansion stroke of any one of the cylinders is less than or equal to the threshold amount of change and all of a plurality of angular accelerations derived during the diagnosis process fall within a predetermined angular acceleration range, diagnose that there is a compression leak in the any one of the cylinders.

When the diagnosis process is performed in a single expansion stroke, and when all of a plurality of angular accelerations acquired during the diagnosis process fall within the predetermined angular range, it may be determined that the angular acceleration changes and takes values around "zero" during the expansion stroke. Therefore, with the diagnosis apparatus having the above configuration, by adding a determination as to whether all of a plurality of angular accelerations acquired during the diagnosis process fall within the predetermined angular range as information for making a determination to diagnose whether there is a compression leak in a cylinder, the accuracy of diagnosing whether there is a compression leak in a cylinder can be increased.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
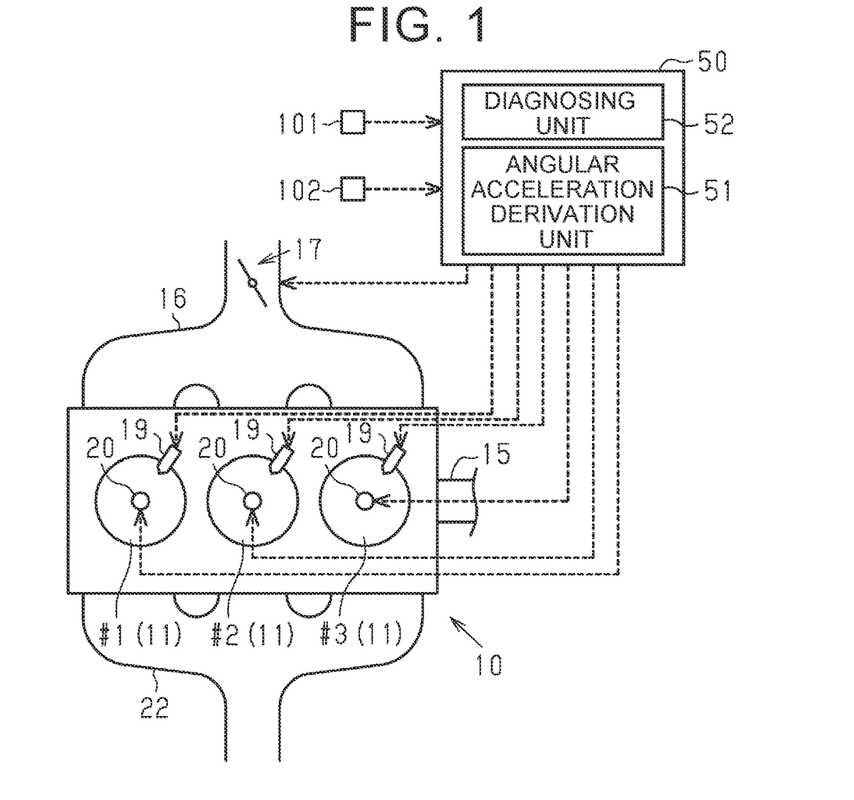
FIG. 1 is a configuration diagram that shows the functional configuration of a diagnosis apparatus that is a diagnosis apparatus for an internal combustion engine of an embodiment of the disclosure and the general configuration of the internal combustion engine that is controlled by the diagnosis apparatus.
Figure 2:
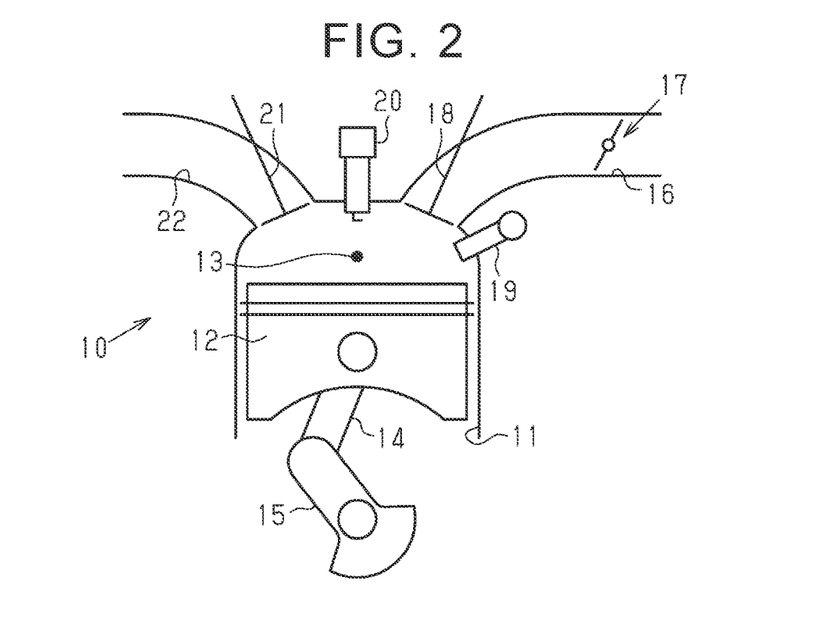
FIG. 2 is a configuration diagram that shows the general configuration of the internal combustion engine.

Hereinafter, an embodiment of a diagnosis apparatus for an internal combustion engine will be described with reference to FIG. 1 to FIG. 9. FIG. 1 shows an in-line three-cylinder internal combustion engine 10 and a diagnosis apparatus 50 that controls the internal combustion engine 10. The diagnosis apparatus 50 has the function of controlling the internal combustion engine 10 and has the function of diagnosing the internal combustion engine 10. The internal combustion engine 10 includes a first cylinder #1, a second cylinder #2, and a third cylinder #3 as cylinders 11. As shown in FIG. 2, a reciprocating piston 12 is provided in each cylinder 11. A space on the upper side of the piston 12 in each cylinder 11 is a combustion chamber 13. Each piston 12 is coupled to a crankshaft 15 via a connecting rod 14. A crank angle θ at the time when the piston 12 is positioned at a top dead center in the first cylinder #1, a crank angle θ at the time when the piston 12 is positioned at a top dead center in the second cylinder #2, and a crank angle θ at the time when the piston 12 is positioned at a top dead center in the third cylinder #3 are positioned at "120 CA" away from each other. In other words, in the internal combustion engine 10, while the crankshaft 15 rotates one revolution, the cylinders 11 each reach the top dead center once at intervals of "120 CA".

As shown in FIG. 1 and FIG. 2, a throttle valve 17 is provided in an intake passage 16 of the internal combustion engine 10. The throttle valve 17 adjusts the amount of intake air flowing through the intake passage 16. When an intake valve 18 is open, intake air is introduced into the associated cylinder 11 via the intake passage 16.

The internal combustion engine 10 includes fuel injection valves 19 that inject fuel, and ignition devices 20 that ignite air-fuel mixture, containing intake air and fuel, with spark discharge. The fuel injection valves 19 and the ignition devices 20 in the same number as the number of the cylinders are provided in the internal combustion engine 10. In the present embodiment, direct injection valves that directly inject fuel into the combustion chambers 13 are provided as the fuel injection valves 19. Exhaust gas generated in each combustion chamber 13 as a result of burning of air-fuel mixture is emitted to an exhaust passage 22 when an associated exhaust valve 21 is open.

As shown in FIG. 1, detection signals from various sensors are input to the diagnosis apparatus 50. Examples of the sensors include an accelerator operation amount sensor 101 and a crank angle sensor 102. The accelerator operation amount sensor 101 detects an accelerator operation amount AC as the amount of operation of an accelerator pedal by a driver of a vehicle and outputs a signal commensurate with the detected accelerator operation amount AC as a detection signal. The crank angle sensor 102 outputs a signal commensurate with the rotation speed of the crankshaft 15 as a detection signal. The diagnosis apparatus 50 controls the throttle valve 17, the fuel injection valves 19, and the ignition devices 20 based on detection signals from the various sensors 101, 102.

The diagnosis apparatus 50 includes an angular acceleration derivation unit 51 and a diagnosing unit 52 as functional units for diagnosing whether there is a compression leak in any one of the cylinders 11. The angular acceleration derivation unit 51 derives an acceleration α of the crankshaft 15 based on a detection signal that is input from the crank angle sensor 102. In other words, the angular acceleration derivation unit 51 derives a value obtained by temporally differentiating a crank angle θ that is a rotation angle of the crankshaft 15 to be detected based on the detection signal as an angular velocity ω of the crankshaft 15. The angular acceleration derivation unit 51 derives a value obtained by temporally differentiating the derived angular velocity ω. An angular acceleration α is positive when an angular velocity ω is increasing, and is negative when an angular velocity ω is decreasing.

When a predetermined diagnosis condition is satisfied, the diagnosing unit 52 executes a diagnosis process for diagnosing whether there is a compression leak in any one of the cylinders 11 based on the acceleration α derived by the angular acceleration derivation unit 51. In the present embodiment, the diagnosing unit 52 determines that the diagnosis condition is satisfied when all of the condition that the internal combustion engine 10 is in steady operation, the condition that the accelerator operation amount AC is "zero", and the condition that a vehicle speed VS is "zero" are satisfied, and executes the diagnosis process. The diagnosis process is a process for diagnosing whether there is a compression leak in the cylinder 11 to be diagnosed based on an angular acceleration α until a predetermined diagnosing period elapses from a start of an expansion stroke of the cylinder 11 to be diagnosed. The details of the diagnosis process will be described later.

Figure 3:
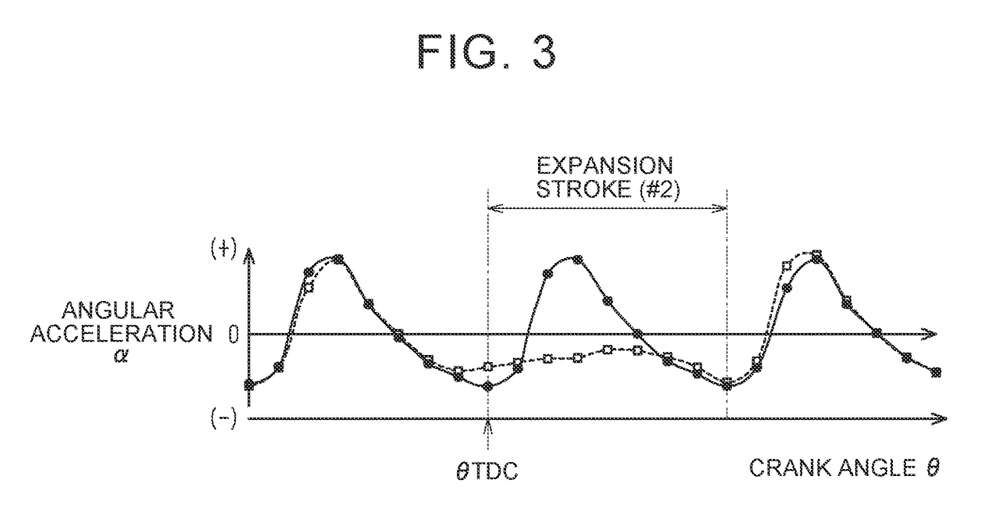
FIG. 3 is a graph that shows the relationship between a crank angle of a crankshaft and an angular acceleration of the crank angle in the in-line three-cylinder internal combustion engine shown in FIG. 1.

Changes in angular acceleration α at the time when there is a compression leak in the second cylinder #2 of the three cylinders 11 in the in-line three-cylinder internal combustion engine 10 will be described with reference to FIG. 3. In FIG. 3, the continuous line represents changes in angular acceleration α at the time when there is no compression leak in the second cylinder #2 in the case where the above-described diagnosis condition is satisfied. The dashed line represents changes in angular acceleration α at the time when there is a compression leak in the second cylinder #2 in the case where the diagnosis condition is satisfied.

When there is no compression leak in any cylinder 11 as represented by the continuous line in FIG. 3, the angular acceleration α varies at a constant period. Specifically, during the expansion stroke of each cylinder 11, the angular velocity ω decreases when the piston 12 is positioned at a compression top dead center, so the angular acceleration α is negative. In the following description, the crank angle θ of the piston 12 positioned at compression top dead center is referred to as "start crank angle θTDC". When the crankshaft 15 rotates from the start crank angle θTDC, propelling force for rotating the crankshaft 15 is obtained as a result of combustion of air-fuel mixture in the combustion chamber 13 on the way, so the angular acceleration α increases. In other words, a change of the angular velocity ω is inverted from negative to positive on the way of movement of the piston 12 toward a bottom dead center, so the angular acceleration α is positive.

On the other hand, when there is a compression leak in the second cylinder #2 as represented by the dashed line in FIG. 3, air-fuel mixture is not so compressed in the combustion chamber 13 in the compression stroke of the second cylinder #2. For example, when there is a closing failure of the intake valve 18, air-fuel mixture in the combustion chamber 13 is pushed out to the intake passage 16 by the piston 12 moving toward the compression top dead center. For this reason, even when the piston 12 approaches the compression top dead center during the compression stroke, the angular velocity ω is not so reduced. As a result, at the start of the expansion stroke of the cylinder 11, the angular acceleration α increases as compared to when there is no compression leak in the second cylinder #2. In other words, the angular acceleration α at the start of the expansion stroke is closer to "zero" than that when there is no compression leak in the second cylinder #2. When there is a compression leak in the second cylinder #2, air-fuel mixture is not burned in the combustion chamber 13 during the expansion stroke. For this reason, during the expansion stroke, the angular velocity ω of the crankshaft 15 does not change so much. In other words, there is no compression leak, and the angular acceleration α does not increase as in the case where air-fuel mixture is burned during the expansion stroke.

FIG. 3 shows changes in angular acceleration α in the case where there is a compression leak only in the second cylinder #2. Changes in angular acceleration α in the case where there is a compression leak only in the first cylinder #1 and changes in angular acceleration α in the case where there is a compression leak only in the third cylinder #3 are similar to changes in angular acceleration α in the case where there is a compression leak only in the second cylinder #2.

Figure 4:
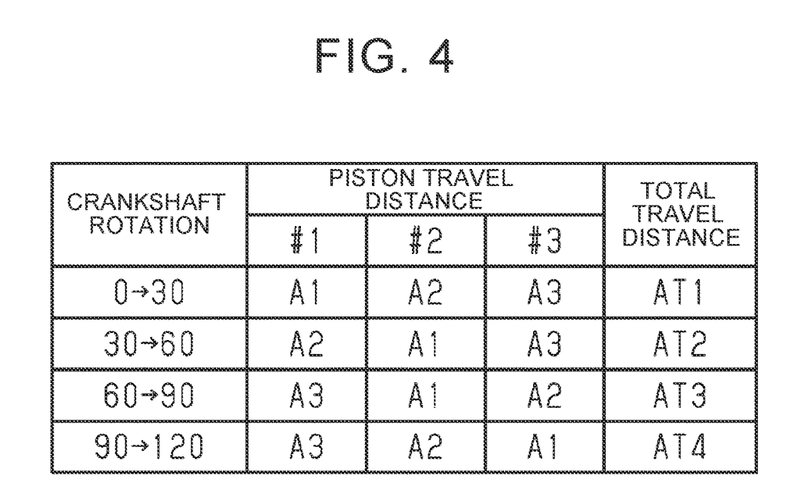
FIG. 4 is a table that shows changes in total travel distance that is the sum of travel distances of three pistons in the in-line three-cylinder internal combustion engine in the embodiment.

The reason why the angular acceleration α does not change so much during the expansion stroke of the cylinder 11 in which there is a compression leak in the in-line three-cylinder internal combustion engine 10 will be described with reference to FIG. 4. In FIG. 4, description will be made on the assumption that the crank angle θ at the time when the piston 12 is positioned at the compression top dead center in the first cylinder #1 of the cylinders 11 is "0(CA)". When the direction in which the piston 12 reciprocates in each cylinder 11 is referred to as moving direction, the amount of movement of the piston 12 in the moving direction is referred to as "piston travel distance" in FIG. 4.

When the crank angle θ changes from "0 (CA)" to "30 (CA)" as a result of rotation of the crankshaft 15, the piston travel distance in the first cylinder #1 is a first distance A1, the piston travel distance in the second cylinder #2 is a second distance A2, and the piston travel distance in the third cylinder #3 is a third distance A3. The first distance A1, the second distance A2, and the third distance A3 are distances different from one another. A total travel distance AT1 that is the sum of the travel distances of the three pistons 12 in this case is equal to the sum of the first distance A1, the second distance A2, and the third distance A3.

When the crank angle θ changes from "30 (CA)" to "60 (CA)" as a result of rotation of the crankshaft 15, the piston travel distance in the first cylinder #1 is the second distance A2, the piston travel distance in the second cylinder #2 is the first distance A1, and the piston travel distance in the third cylinder #3 is the third distance A3. A total travel distance AT2 in this case is equal to the sum of the first distance A1, the second distance A2, and the third distance A3. In other words, the total travel distance AT2 is equal to the total travel distance AT1.

When the crank angle θ changes from "60 (CA)" to "90 (CA)" as a result of rotation of the crankshaft 15, the piston travel distance in the first cylinder #1 is the third distance A3, the piston travel distance in the second cylinder #2 is the first distance A1, and the piston travel distance in the third cylinder #3 is the second distance A2. A total travel distance AT3 in this case is equal to the sum of the first distance A1, the second distance A2, and the third distance A3. In other words, the total travel distance AT3 is equal to the total travel distance AT1 or the total travel distance AT2.

When the crank angle θ changes from "90 (CA)" to "120 (CA)" as a result of rotation of the crankshaft 15, the piston travel distance in the first cylinder #1 is the third distance A3, the piston travel distance in the second cylinder #2 is the second distance A2, and the piston travel distance in the third cylinder #3 is the first distance A1. A total travel distance AT4 in this case is equal to the sum of the first distance A1, the second distance A2, and the third distance A3. In other words, the total travel distance AT4 is equal to the total travel distance AT1 or the total travel distance AT2 or the total travel distance AT3.

When the piston 12 reciprocates in each cylinder 11, frictional force acts on the crankshaft 15 and the piston 12 as a force interfering with rotation of the crankshaft 15 in the internal combustion engine 10. For this reason, as the above-described total travel distance extends, the rotation of the crankshaft 15 more easily decelerates. In other words, when the crankshaft 15 is rotated by "30 (CA)", the angular acceleration α more easily decreases as the total travel distance extends.

In the in-line three-cylinder internal combustion engine 10, as described with reference to FIG. 4, the total travel distance in the case where the crank angle θ is changed in units of "30 (CA)" does not change. For this reason, when there is a compression leak in one of the cylinders 11, propelling force resulting from combustion is not obtained during the expansion stroke of the cylinder 11 in which there is a compression leak, so the angular velocity ω gradually reduces. However, in the in-line three-cylinder internal combustion engine 10, as described with reference to FIG. 4, the total travel distance in the case where the crank angle θ is changed in units of "30 (CA)" remains unchanged, so the amount of reduction in angular velocity ω during then does not change so much. In other words, in the case of the in-line three-cylinder internal combustion engine 10, during the expansion stroke of the cylinder 11 in which there is a compression leak, the angular acceleration α does not change so much.

Figure 5:
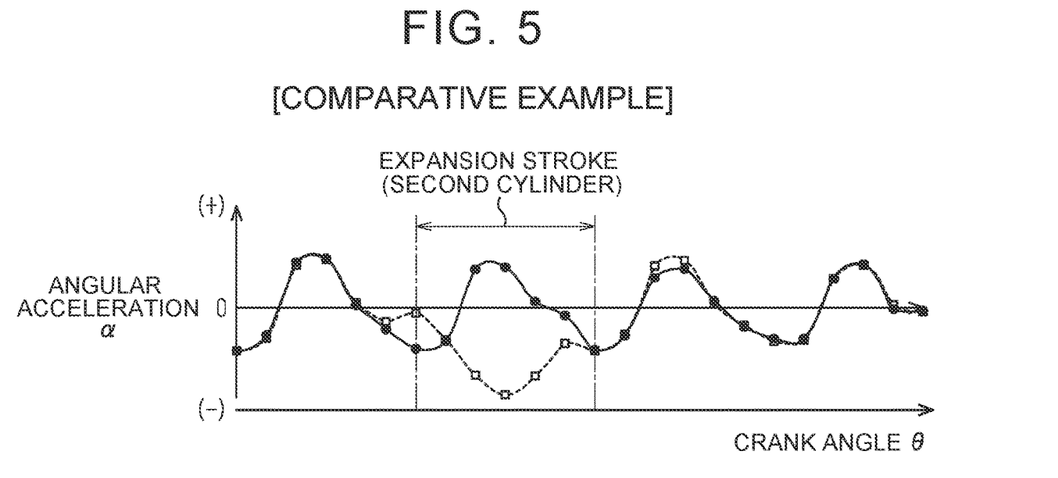
FIG. 5 is a graph that shows the relationship between a crank angle and an angular acceleration in an in-line four-cylinder internal combustion engine as a first comparative example of the embodiment.

Changes in angular acceleration α at the time when there is a compression leak in one of four cylinders, for example, a second cylinder, in an in-line four-cylinder internal combustion engine will be described with reference to FIG. 5. In FIG. 5, the continuous line represents changes in angular acceleration α at the time when there is no compression leak in the second cylinder in the case where the above-described diagnosis condition is satisfied. The dashed line represents changes in angular acceleration α at the time when there is a compression leak in the second cylinder in the case where the diagnosis condition is satisfied.

When there is no compression leak in the second cylinder as represented by the continuous line in FIG. 5, the angular acceleration α varies at a constant period. On the other hand, when there is a compression leak in the second cylinder as represented by the dashed line in FIG. 5, during the expansion stroke, the angular acceleration α is negative, and the absolute value of the angular acceleration α gradually increases from the start of the expansion stroke. This is because, in the in-line four-cylinder internal combustion engine, different from the in-line three-cylinder internal combustion engine 10, the total travel distance in the case where the crank angle θ during the expansion stroke is changed in units of "30 (CA)" changes with a change in crank angle θ. Specifically, in the first half of the expansion stroke, the total travel distance in the case where the crank angle θ is changed in units of "30 (CA)" extends with a change in crank angle θ. On the other hand, in the second half of the expansion stroke, the total travel distance in the case where the crank angle θ is changed in units of "30 (CA)" shortens with a change in crank angle θ.

Figure 6:
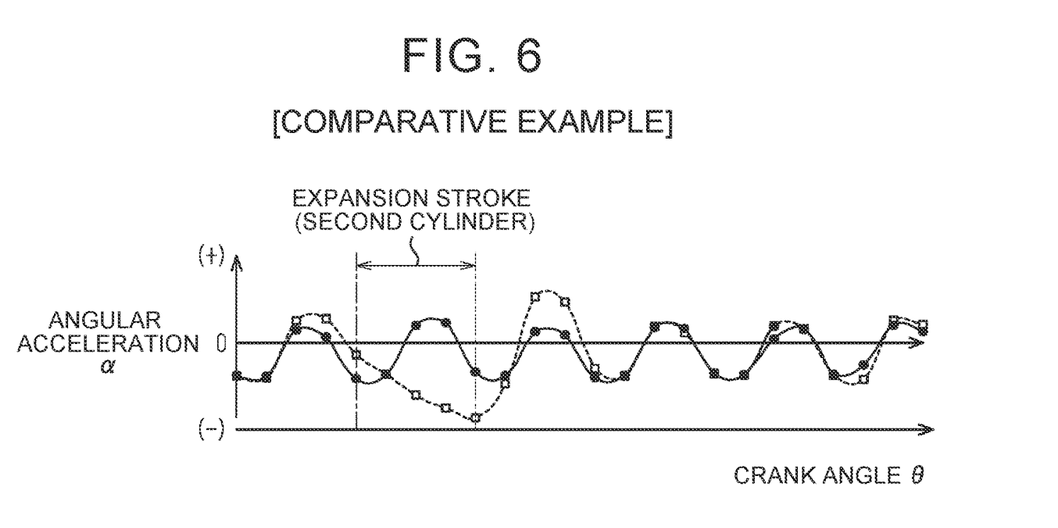
FIG. 6 is a graph that shows the relationship between a crank angle and an angular acceleration in a six-cylinder internal combustion engine as a second comparative example of the embodiment.

Changes in angular acceleration α at the time when there is a compression leak in one of six cylinders, for example, a second cylinder, in a six-cylinder internal combustion engine will be described with reference to FIG. 6. In FIG. 6, the continuous line represents changes in angular acceleration α at the time when there is no compression leak in the second cylinder in the case where the above-described diagnosis condition is satisfied. The dashed line represents changes in angular acceleration α at the time when there is a compression leak in the second cylinder in the case where the diagnosis condition is satisfied.

When there is no compression leak in the second cylinder as represented by the continuous line in FIG. 6, the angular acceleration α varies at a constant period. On the other hand, when there is a compression leak in the second cylinder as represented by the dashed line in FIG. 6, during the expansion stroke, the angular acceleration α is negative, and the absolute value of the angular acceleration α gradually increases from the start of the expansion stroke. In the six-cylinder internal combustion engine, as well as the in-line three-cylinder internal combustion engine 10, the total travel distance in the case where the crank angle θ is changed in units of "30 (CA)" does not change. However, during the expansion stroke of one of the cylinders, the compression stroke of another one of the cylinders is started. For this reason, during the expansion stroke of a cylinder in which there is a compression leak, the angular acceleration α decreases under the influence of the compression stroke that takes place in another one of the cylinders.

Next, a process routine at the time of causing the diagnosing unit 52 to execute a diagnosis process will be described with reference to FIG. 7 and FIG. 8. The process routine is executed when the above-described diagnosis condition is satisfied. In the process routine, in step S11, it is determined whether the crank angle θ has become the start crank angle θTDC. As the crank angle θ has become the start crank angle θ TDC, it may be determined that, of the cylinders 11, the expansion stroke has been started in the cylinder 11 to be diagnosed. When the crank angle θ has not become the start crank angle θTDC (NO in S11), the determination of step S11 is repeated until the crank angle θ becomes the start crank angle θTDC. On the other hand, when the crank angle θ has become the start crank angle θTDC (YES in S11), the process proceeds to the next step S12.

In step S12, it is determined whether the difference between an angular acceleration α(θTDC) at the start of the expansion stroke of the cylinder 11 to be diagnosed and an angular acceleration αb at the start of the expansion stroke of another one of the cylinders 11 is greater than or equal to a threshold difference ΔαTDCTh. An angular acceleration α at the time point at which affirmative determination is made in step S11 is acquired as the angular acceleration α(θTDC) at the start of the expansion stroke of the cylinder 11 to be diagnosed. In the present embodiment, an acceleration α derived by the angular acceleration derivation unit 51 at the start of the last expansion stroke of the expansion strokes of the other cylinders, performed before the start of the expansion stroke of the cylinder 11 to be diagnosed, is employed as the acceleration αb at the start of the expansion stroke of another one of the cylinders 11. When there is a compression leak in the cylinder 11 to be diagnosed, while there is no compression leak in another one of the cylinders 11, there is a deviation between the angular acceleration α at the start of the expansion stroke of the cylinder 11 to be diagnosed and the angular acceleration α at the start of the expansion stroke of another one of the cylinders 11. Therefore, the threshold difference ΔαTDCTh is set as a criterion for determination as to whether there is such a deviation. For this reason, when the difference between the angular acceleration α(θTDC) and the angular acceleration αb is less than the threshold difference ΔαTDCTh, there is no deviation. On the other hand, when the difference is greater than or equal to the threshold difference ΔαTDCTh, there is a deviation.

When the difference between the angular acceleration α(θTDC) and the angular acceleration αb is greater than or equal to the threshold difference ΔαTDCTh (YES in S12), the process proceeds to the next step S13. In step S13, a compression leak diagnosis counter CNT is incremented by "1". The compression leak diagnosis counter CNT is a counter that is updated when it is determined that there is a possibility of a compression leak in the cylinder 11 to be diagnosed. As the compression leak diagnosis counter CNT is updated, the process proceeds to the next step S14. On the other hand, when the difference is less than the threshold difference ΔαTDCTh in step S12 (NO), the process proceeds to the next step S14. In other words, when the difference is less than the threshold difference ΔαTDCTh, it is not determined that there is a possibility of a compression leak in the cylinder 11 to be diagnosed, so the compression leak diagnosis counter CNT is not updated.

In step S14, it is determined whether the crank angle θ has become a first crank angle θATDC1. The first crank angle θATDC1 is a crank angle θ during the expansion stroke and is the sum of the start crank angle θTDC and a predetermined crank angle Δθ. An angle smaller than "90 (CA)" is set as the predetermined crank angle θ. More specifically, an angle smaller than "45 (CA)" is set as the predetermined crank angle θ. In the present embodiment, an angle smaller than or equal to "30 (CA)" is set as the predetermined crank angle θ. In the present embodiment, a period required for the crank angle θ to change by the predetermined crank angle θ corresponds to "predetermined period", and the length of the period is shorter than half the length of the period of the expansion stroke. When the crank angle θ has not become the first crank angle θATDC1 (NO in S14), the predetermined period has not elapsed, so the determination of step S14 is repeated until the crank angle θ becomes the first crank angle θATDC1.

On the other hand, when the crank angle θ has become the first crank angle θATDC1 (YES in S14), the predetermined period has elapsed, so the process proceeds to the next step S15. In step S15, it is determined whether the angular acceleration α(θATDC1) at the time when the crank angle θ is the first crank angle θATDC1 falls within a predetermined angular acceleration range. An upper limit angular acceleration αUL is set as an upper limit of the predetermined angular acceleration range, and a lower limit angular acceleration αLL is set as a lower limit of the predetermined angular acceleration range. When there is a compression leak in the cylinder 11 to be diagnosed, air-fuel mixture is not burned during the expansion stroke of the cylinder 11 to be diagnosed. When there is no compression leak in the cylinder 11 to be diagnosed and air-fuel mixture is burned during the expansion stroke of the cylinder 11, propelling force for rotating the crankshaft 15 is generated as a result of burning of air-fuel mixture, so the angular velocity ω of the crankshaft 15 significantly changes. In contrast to this, air-fuel mixture is not burned during the expansion stroke, propelling force for rotating the crankshaft 15 is not obtained, and the angular velocity ω of the crankshaft 15 does not change so much. In other words, when no burning takes place during the expansion stroke because of a compression leak, the angular acceleration α changes and takes values around "zero" as compared to the case where burning takes place during the expansion stroke. In the present embodiment, the upper limit angular acceleration αUL and the lower limit angular acceleration αLL are set as a criterion for determination as to whether the angular acceleration α changes and takes values around "zero".

When the angular acceleration $\alpha(\theta ATDC1)$ falls within the predetermined angular acceleration range in step S15 (YES), the process proceeds to the next step S16. In step S16, the difference between the angular acceleration $\alpha(\theta ATDC1)$ at the time when the crank angle $\theta$ is the first crank angle $\theta ATDC1$ and the angular acceleration $\alpha(\theta TDC)$ at the time when the crank angle $\theta$ is the start crank angle $\theta TDC$ is calculated as the amount of change $\Delta\alpha$ in angular acceleration per a predetermined period. In the next step S17, it is determined whether the amount of change $\Delta\alpha$ calculated in step S16 is less than or equal to a threshold amount of change $\Delta\alpha Th$. When there is a compression leak in the cylinder 11 to be diagnosed, the angular acceleration $\alpha$ does not change so much during the expansion stroke of the cylinder 11. Therefore, the threshold amount of change $\Delta\alpha Th$ is set as a criterion for determination as to whether the amount of change in angular acceleration $\alpha$ per the predetermined period is small. In other words, the case where the amount of change $\Delta\alpha$ is less than or equal to the threshold amount of change $\Delta\alpha Th$ may be regarded as the case where the angular acceleration $\alpha$ does not change so much.

When the amount of change $\Delta\alpha$ in angular acceleration per the predetermined period is less than or equal to the threshold amount of change $\Delta\alpha Th$ in step S17 (YES), the process proceeds to the next step S18. In step S18, the compression leak diagnosis counter CNT is incremented by "1". In other words, when both the determination of step S15 and the determination of step S17 are affirmative, it is determined that there is a possibility of a compression leak in the cylinder 11 to be diagnosed, so the compression leak diagnosis counter CNT is updated. As the compression leak diagnosis counter CNT is updated, the process proceeds to step S19.

On the other hand, when the angular acceleration $\alpha(\theta ATDC1)$ at the time when the crank angle $\theta$ is the first crank angle $\theta ATDC1$ does not fall within the predetermined angular acceleration range in step S15 (NO), the process proceeds to step S19. In other words, when the angular acceleration $\alpha(\theta ATDC1)$ does not fall within the predetermined angular acceleration range, it may be determined that the angular acceleration $\alpha(\theta ATDC1)$ deviates from "0", so the compression leak diagnosis counter CNT is not updated. When the amount of change $\Delta\alpha$ calculated in step S16 is greater than the threshold amount of change $\Delta\alpha Th$ in step S17 (NO), the process proceeds to step S19. In other words, when the amount of change $\Delta\alpha$ is greater than the threshold amount of change $\Delta\alpha Th$, it may be determined that the angular acceleration $\alpha$ significantly changes during the expansion stroke, so the compression leak diagnosis counter CNT is not updated.

In step S19, it is determined whether the crank angle $\theta$ has become a second crank angle $\theta ATDC2$. The second crank angle $\theta ATDC2$ is a crank angle $\theta$ during the expansion stroke and is the sum of the first crank angle $\theta ATDC1$ and the predetermined crank angle $\Delta\theta$. When the crank angle $\theta$ has not become the second crank angle $\theta ATDC2$ (NO in S19), the predetermined period has not elapsed, so the determination of step S19 is repeated until the crank angle $\theta$ becomes the second crank angle $\theta ATDC2$.

On the other hand, when the crank angle $\theta$ has become the second crank angle $\theta ATDC2$ in step S19 (YES), the predetermined period has elapsed, so the process proceeds to the next step S20. In step S20, it is determined whether the angular acceleration $\alpha(\theta ATDC2)$ at the time when the crank angle $\theta$ is the second crank angle $\theta ATDC2$ falls within the predetermined angular acceleration range. When the angular acceleration $\alpha(\theta ATDC2)$ falls within the predetermined angular acceleration range in step S20 (YES), the process proceeds to the next step S21. In step S21, the difference between the angular acceleration $\alpha(\theta ATDC2)$ at the time when the crank angle $\theta$ is the second crank angle $\theta ATDC2$ and the angular acceleration $\alpha(\theta ATDC1)$ at the time when the crank angle $\theta$ is the first crank angle $\theta ATDC1$ is calculated as the amount of change $\Delta\alpha$ in angular acceleration per the predetermined period. In the next step S22, it is determined whether the amount of change $\Delta\alpha$ calculated in step S21 is less than or equal to the threshold amount of change $\Delta\alpha Th$.

When the amount of change $\Delta\alpha$ in angular acceleration per the predetermined period is less than or equal to the threshold amount of change $\Delta\alpha Th$ in step S22 (YES), the process proceeds to the next step S23. In step S23, the compression leak diagnosis counter CNT is incremented by "1". In other words, when both the determination of step S20 and the determination of step S22 are affirmative, it is determined that there is a possibility of a compression leak in the cylinder 11 to be diagnosed, so the compression leak diagnosis counter CNT is updated. As the compression leak diagnosis counter CNT is updated, the process proceeds to step S24.

On the other hand, when the angular acceleration $\alpha(\theta ATDC2)$ at the time when the crank angle $\theta$ is the second crank angle $\theta ATDC2$ does not fall within the predetermined angular acceleration range in step S20 (NO), the process proceeds to step S24. In other words, when the angular acceleration $\alpha(\theta ATDC2)$ does not fall within the predetermined angular acceleration range, the compression leak diagnosis counter CNT is not updated. When the amount of change $\Delta\alpha$ calculated in step S21 is greater than the threshold amount of change $\Delta\alpha Th$ in step S22 (NO), the process proceeds to step S24. In other words, when the amount of change $\Delta\alpha$ is greater than the threshold amount of change $\Delta\alpha Th$, the compression leak diagnosis counter CNT is not updated.

In step S24, it is determined whether the crank angle $\theta$ has become a third crank angle $\theta ATDC3$. The third crank angle $\theta ATDC3$ is a crank angle $\theta$ during the expansion stroke and is the sum of the second crank angle $\theta ATDC2$ and the predetermined crank angle $\Delta\theta$. When the crank angle $\theta$ has not become the third crank angle $\theta ATDC3$ (NO in S24), the predetermined period has not elapsed, so the determination of step S24 is repeated until the crank angle $\theta$ becomes the third crank angle $\theta ATDC3$.

On the other hand, when the crank angle $\theta$ has become the third crank angle $\theta ATDC3$ in step S24 (YES), the predetermined period has elapsed, so the process proceeds to the next step S25. In step S25, it is determined whether the angular acceleration $\alpha(\theta ATDC3)$ at the time when the crank angle $\theta$ is the third crank angle $\theta ATDC3$ falls within a predetermined angular acceleration range. When the angular acceleration $\alpha(\theta ATDC2)$ falls within the predetermined angular acceleration range in step S25 (YES), the process proceeds to the next step S26. In step S26, the difference between the angular acceleration $\alpha(\theta ATDC3)$ at the time when the crank angle $\theta$ is the third crank angle $\theta ATDC3$ and the angular acceleration $\alpha(\theta ATDC2)$ at the time when the crank angle $\theta$ is the second crank angle $\theta ATDC2$ is calculated as the amount of change $\Delta\alpha$ in angular acceleration per the predetermined period. In the next step S27, it is determined whether the amount of change $\Delta\alpha$ calculated in step S26 is less than or equal to the threshold amount of change $\Delta\alpha Th$.

When the amount of change $\Delta\alpha$ in angular acceleration per the predetermined period is less than or equal to the threshold amount of change ΔαTh in step S27 (YES), the process proceeds to the next step S28. In step S28, the compression leak diagnosis counter CNT is incremented by "1". In other words, when both the determination of step S25 and the determination of step S27 are affirmative, it is determined that there is a possibility of a compression leak in the cylinder 11 to be diagnosed, so the compression leak diagnosis counter CNT is updated. As the compression leak diagnosis counter CNT is updated, the process proceeds to step S29.

On the other hand, when the angular acceleration α(θATDC3) at the time when the crank angle θ is the third crank angle θATDC3 does not fall within the predetermined angular acceleration range in step S25 (NO), the process proceeds to step S29. In other words, when the angular acceleration α(θATDC3) does not fall within the predetermined angular acceleration range, the compression leak diagnosis counter CNT is not updated. When the amount of change Δα calculated in step S26 is greater than the threshold amount of change ΔαTh in step S27 (NO), the process proceeds to step S29. In other words, when the amount of change Δα is greater than the threshold amount of change ΔαTh, the compression leak diagnosis counter CNT is not updated.

In step S29, it is determined whether the compression leak diagnosis counter CNT is greater than or equal to a threshold value CNTTh. In the present embodiment, "4" is set as the determination value CNTTh. In other words, only when all the processes of step S13, step S18, step S23, and step S28 are executed, the compression leak diagnosis counter CNT becomes greater than or equal to the threshold value CNTTh. When the compression leak diagnosis counter CNT is greater than or equal to the threshold value CNTTh (YES in S29), the process proceeds to the next step S30. In step S30, it is diagnosed that there is a compression leak in the cylinder 11 to be diagnosed. In other words, in the present embodiment, a period required for the crank angle θ to change from the start crank angle θTDC to the third crank angle θATDC3 by the rotation of the crankshaft 15 corresponds to "diagnosing period". In the present embodiment, during the diagnosing period, the angular acceleration α is acquired in each predetermined period. When diagnosis is thus carried out, the process proceeds to step S31.

On the other hand, when the compression leak diagnosis counter CNT is less than the threshold value CNTTh in step S29 (NO), the process proceeds to the next step S31. In other words, when the compression leak diagnosis counter CNT is less than the determination value CNTTh, it is not diagnosed that there is a compression leak in the cylinder 11 to be diagnosed.

In step S31, the compression leak diagnosis counter CNT is reset to "0". In other words, the diagnosis process over the cylinder 11 to be diagnosed ends. After that, the process routine ends.

Through execution of the above process routine, when it is diagnosed that there is a compression leak in the cylinder 11 to be diagnosed, occurrence of a compression leak is stored in the memory of the diagnosis apparatus 50. At this time, the number of the cylinder 11 in which there is a compression leak may also be stored in the memory. When it is diagnosed that there is a compression leak in the cylinder 11 to be diagnosed, information about occurrence of a compression leak is provided to an occupant of the vehicle.

Figure 9:
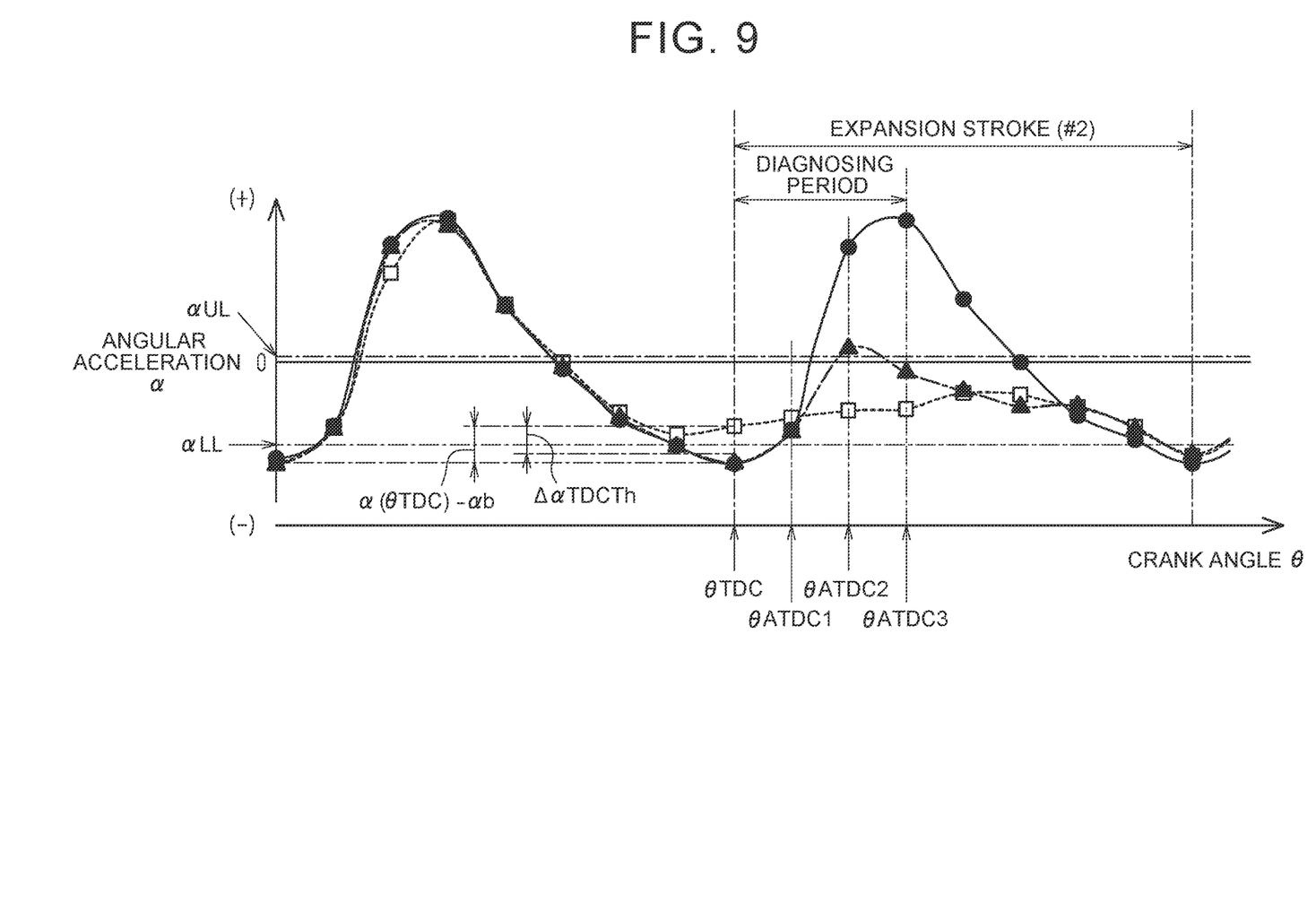
FIG. 9 is a graph that shows the relationship between a crank angle and an angular acceleration when a misfire has occurred during an expansion stroke of one of cylinders of the in-line three-cylinder internal combustion engine, further added to the graph shown in FIG. 3.

The operation and advantageous effects of the present embodiment will be described with reference to FIG. 9. In FIG. 9, the continuous line represents changes in angular acceleration α in the case where there is no compression leak, misfire, or the like, in any cylinder 11 and the internal combustion engine 10 is in normal operation. The dashed line represents changes in angular acceleration α in the case where there is a compression leak in any one of the cylinders 11, for example, the second cylinder #2. The alternate long and short dashed line represents changes in angular acceleration α in the case where there is no compression leak in, for example, the second cylinder #2 but a misfire occurs during the expansion stroke of the second cylinder #2.

When there is a compression leak in the second cylinder #2, air-fuel mixture flows out of the combustion chamber 13 of the second cylinder #2 during the compression stroke of the second cylinder #2, so, even when the crank angle θ approaches the start crank angle θTDC, the angular acceleration α does not decrease so much as represented by the dashed line in FIG. 9. In other words, as compared to the case where there is no compression leak in the second cylinder #2, the angular acceleration α at the time point at which the crank angle θ has become the start crank angle θTDC, that is, the angular acceleration α at the start of the expansion stroke, increases.

Therefore, the difference between the angular acceleration α(θTDC) at the start of the expansion stroke of the second cylinder #2 and the angular acceleration αb at the start of the expansion stroke of another one of the cylinders 11 is greater than or equal to the threshold difference ΔαTDCTh. In this case, it may be estimated that there is a possibility of a compression leak in the second cylinder #2.

When the diagnosis process is being executed during the expansion stroke of the second cylinder #2, each of the angular accelerations α(θATDC1), α(θATDC2), α(θATDC3) for each predetermined period falls within the predetermined angular acceleration range. Furthermore, during execution of the diagnosis process, the fact that the amount of change Δα in angular acceleration per the predetermined period is less than or equal to the threshold amount of change Δωth successively occurs. Therefore, when the angular acceleration α changes as represented by the dashed line in FIG. 9, it may be diagnosed that there is a compression leak in the second cylinder #2.

When there is no compression leak in the second cylinder #2 but a misfire has occurred, air-fuel mixture in the combustion chamber 13 is compressed in the compression stroke of the second cylinder #2, so, as represented by the alternate long and short dashed line in FIG. 9, the angular acceleration α decreases as the crank angle θ approaches the start crank angle θTDC. Therefore, in this case, the difference between the angular acceleration α(θTDC) at the start of the expansion stroke of the second cylinder #2 and the angular acceleration αb at the start of the expansion stroke of another one of the cylinders 11 is less than the threshold difference ΔαTDCTh.

During the expansion stroke of the second cylinder #2 after that, burning does not take place, but the piston 12 is pushed toward the bottom dead center by air-fuel mixture compressed in the compression stroke. As a result, as represented by the alternate long and short dashed line in FIG. 9, the angular acceleration α increases as compared to when there is a compression leak. For this reason, when the diagnosis process is executed during the expansion stroke, at least one of the angular accelerations α(θATDC1), α(θATDC2), α(θATDC3) acquired during execution of the diagnosis process falls outside the predetermined angular acceleration range. Furthermore, the fact that the amount of change Δα in angular acceleration per the predetermined period is less than or equal to the threshold amount of change $\Delta\omega$th does not successively occur. For this reason, when a misfire occurs although there is no compression leak in the second cylinder #2, it is not erroneously diagnosed that there is a compression leak in the second cylinder #2. Therefore, the accuracy of diagnosing whether there is a compression leak in the cylinder 11 may be increased.

The operation and advantageous effects in the case where there is a compression leak in the first cylinder #1, the operation and advantageous effects in the case where there is a compression leak in the third cylinder #3, and the operation and advantageous effects in the case where there is a compression leak in the second cylinder #2 are similar to one another. For this reason, the description of the case where there is a compression leak in the first cylinder #1 and the case where there is a compression leak in the third cylinder #3 is omitted.

The above-describe embodiment may be modified as follows. The embodiment and the following modifications may be implemented in combination with each other without any technical contradiction.

Figure 7:
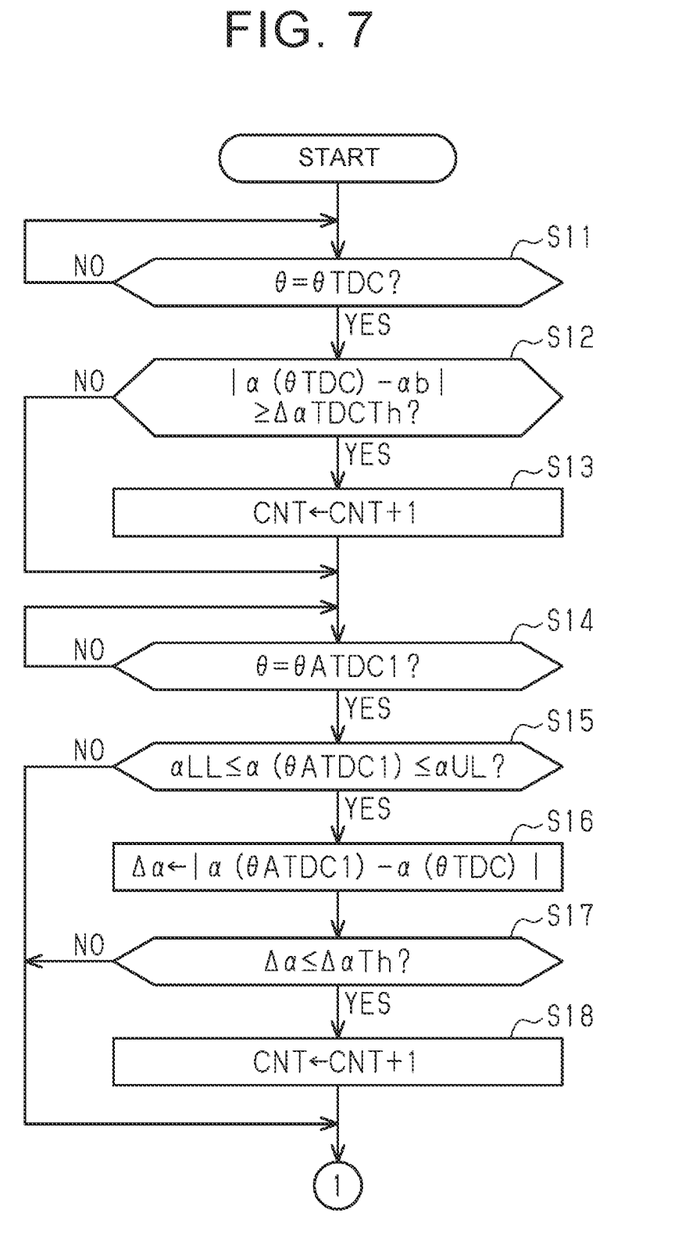
FIG. 7 is a first half of a flowchart that illustrates a process routine that the diagnosis apparatus of the embodiment executes at the time of diagnosing whether there is a compression leak in any cylinder of the internal combustion engine.
Figure 8:
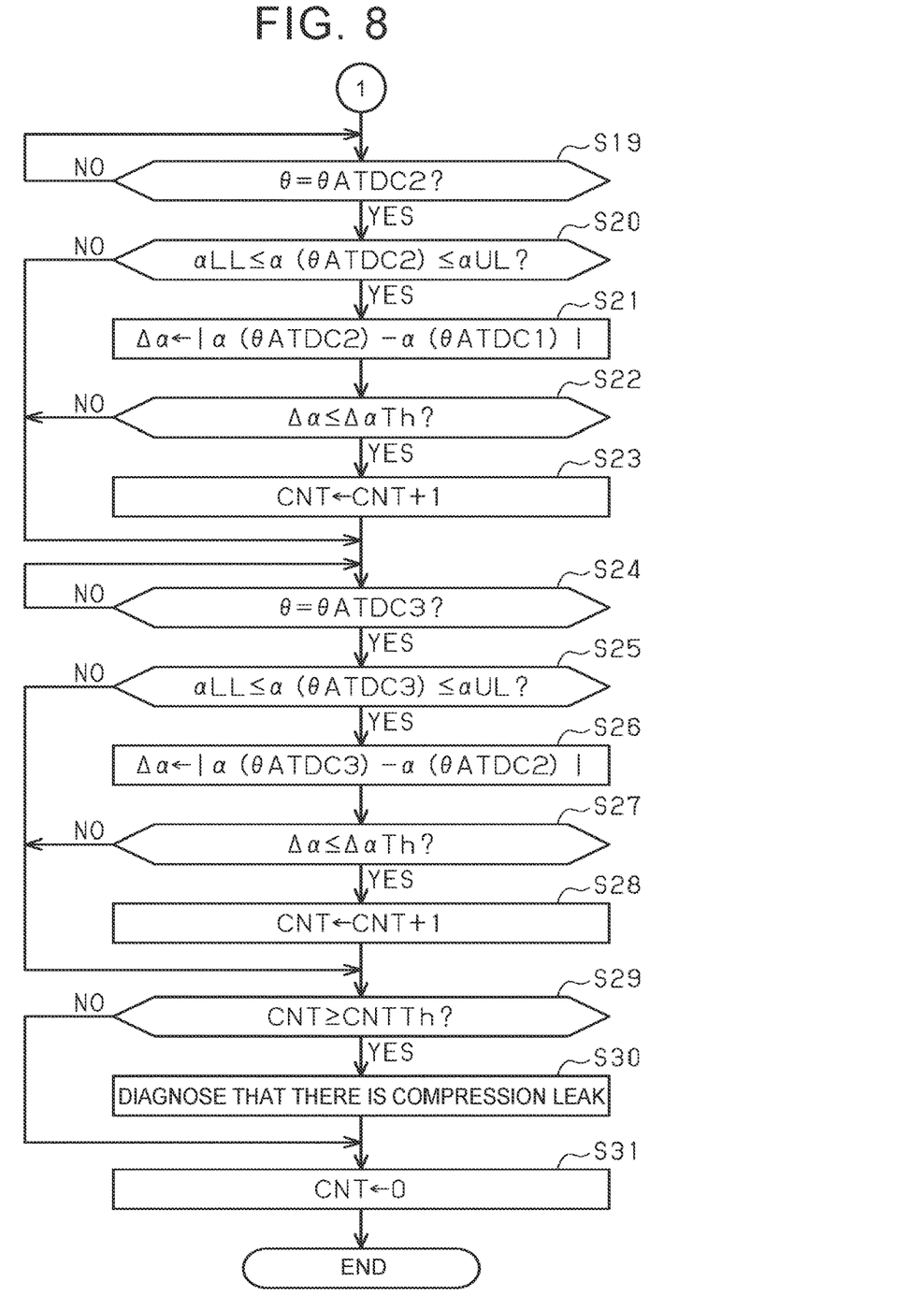
FIG. 8 is a second half of the flowchart that illustrates the process routine.

In the process routine shown in FIG. 7 and FIG. 8, at least one of the determinations of step S15, step S20, and step S25 may be omitted. In other words, when the diagnosis condition that is a condition for diagnosing that there is a compression leak in the cylinder 11 contains the condition that the amount of change $\Delta\alpha$ in angular acceleration per the predetermined period is greater than or equal to the threshold amount of change $\Delta\alpha$th, the diagnosis condition does not need to contain the condition that the angular acceleration $\alpha$ acquired during the diagnosis process falls within the predetermined angular acceleration range.

In the process routine shown in FIG. 7 and FIG. 8, the determination of step S12 may be omitted. In other words, the diagnosis condition for diagnosing that there is a compression leak in the cylinder 11 contains the condition that the amount of change $\Delta\alpha$ in angular acceleration per the predetermined period is greater than or equal to the threshold amount of change $\Delta\alpha$th, the diagnosis condition does not need to contain the condition that the difference is greater than or equal to the threshold difference $\Delta\alpha$TDCTh.

In the above-described embodiments, when negative determination is made in at least one of step S17, step S22, and step S27, it is not diagnosed that there is a compression leak in the cylinder 11. However, when affirmative determination is made in step S12, it may be diagnosed that there is a compression leak in the cylinder 11 when affirmative determination is made in at least one of step S17, step S22, and step S27.

When the predetermined crank angle θ is less than "45 (CA)", the predetermined crank angle θ may be a value different from "30 (CA)". In this case as well, the predetermined period may be shorter than half of the first half period of the expansion stroke. In other words, during the diagnosis process of the single expansion stroke, the determination as to whether the amount of change $\Delta\alpha$ in angular acceleration per the predetermined period is greater than or equal to the threshold amount of change $\Delta\alpha$Th can be repeated.

The predetermined crank angle θ may be greater than "45 (CA)" as long as the predetermined crank angle θ is less than "90 (CA)". In this case, the predetermined period is longer than half the first half period of the expansion stroke. Therefore, in the diagnosis process in the single expansion stroke, the determination as to whether the amount of change $\Delta\alpha$ in angular acceleration per the predetermined period is less than or equal to the threshold amount of change $\Delta\alpha$Th is performed only once. In this case, when the amount of change $\Delta\alpha$ is greater than or equal to the threshold amount of change $\Delta\alpha$Th, it is diagnosed that there is a compression leak in the cylinder 11.

In the above-described embodiment, as the crank angle θ changes by the predetermined crank angle $\Delta\theta$, it is regarded that the predetermined period has elapsed. When the above-described diagnosis condition is satisfied, a period required for time to elapse by the predetermined period may be set for the predetermined period. In this case, the amount of change in angular acceleration in the predetermined time is derived as the amount of change $\Delta\alpha$ in angular acceleration per the predetermined period.

The internal combustion engine may include a port injection valve that injects fuel into the intake passage 16 as a fuel injection valve.

What is claimed is:

1. A diagnosis apparatus for an internal combustion engine, the internal combustion engine being an in-line three-cylinder internal combustion engine, the diagnosis apparatus comprising:
    a diagnosing unit configured to, when the internal combustion engine is in steady operation, execute a diagnosis process for diagnosing whether there is a compression leak in any cylinder; and
    an angular acceleration derivation unit configured to derive an angular acceleration of a crankshaft of the internal combustion engine, wherein the diagnosing unit is configured to, when an amount of change in the angular acceleration per a predetermined period during an expansion stroke of any one of the cylinders is less than or equal to a threshold amount of change in the diagnosis process, diagnose that there is a compression leak in the cylinder.

2. The diagnosis apparatus according to claim 1, wherein the predetermined period is a period required for a crank angle of the crankshaft to change by a predetermined crank angle.

3. The diagnosis apparatus according to claim 1, wherein the diagnosing unit is configured to:
    in the diagnosis process, repeatedly perform a determination as to whether the amount of change in the angular acceleration per the predetermined period during the expansion stroke of each cylinder is less than or equal to the threshold amount of change; and
    when the amount of change of any one of the cylinders is successively less than or equal to the threshold amount of change, diagnose that there is a compression leak in the any one of the cylinders.

4. The diagnosis apparatus according to claim 1, wherein the diagnosing unit is configured to:
    in the diagnosis process, repeatedly perform a determination as to whether the amount of change in the angular acceleration per the predetermined period during the expansion stroke of each cylinder is less than or equal to the threshold amount of change; and
    when the number of times the amount of change of any one of the cylinders is less than or equal to the threshold amount of change is acquired and the acquired number of times is greater than or equal to a threshold value, diagnose that there is a compression leak in the any one of the cylinders.

5. The diagnosis apparatus according to claim 1, wherein the diagnosing unit is configured to, in the diagnosis process, on condition that an amount of change in the angular acceleration per the predetermined period during the expansion stroke of one of the cylinders is less than or equal to the threshold amount of change and a difference between the angular acceleration at a start of the expansion stroke of the one of the cylinders and the angular acceleration at a start of the expansion stroke of another one of the cylinders is greater than or equal to a threshold difference, diagnose that there is a compression leak in the one of the cylinders.

6. The diagnosis apparatus according to claim 1, wherein the diagnosing unit is configured to, in the diagnosis process, on condition that an amount of change in the angular acceleration per the predetermined period during the expansion stroke of any one of the cylinders is less than or equal to the threshold amount of change and all of a plurality of the angular accelerations derived during the diagnosis process fall within a predetermined angular acceleration range, diagnose that there is a compression leak in the any one of the cylinders.

* * * * *